United States Patent [19]

Hayashi et al.

[11] 4,141,637
[45] Feb. 27, 1979

[54] ELECTRICALLY CONTROLLED SELF-TIMER DEVICES FOR SINGLE LENS REFLEX CAMERAS

[75] Inventors: Toshio Hayashi, Sakai; Hiroshi Ueda, Nara; Shigeru Oyokota, Sakai, all of Japan

[73] Assignee: Minolta Camera Kabushiki Kaisha, Osaka, Japan

[21] Appl. No.: 832,616

[22] Filed: Sep. 12, 1977

[30] Foreign Application Priority Data

Sep. 28, 1976 [JP] Japan .................. 51-116869

[51] Int. Cl.² .................. G03B 13/02; G03B 9/64
[52] U.S. Cl. ...................... 354/219; 354/238
[58] Field of Search ............. 354/22, 23 R, 60 R, 354/60 L, 154, 156, 219, 224, 225, 237–240, 266, 267, 289

[56] References Cited

U.S. PATENT DOCUMENTS

| | | | |
|---|---|---|---|
| 3,613,543 | 10/1971 | Mita | 354/154 |
| 3,875,579 | 4/1975 | Mochizuki | 354/154 |
| 3,902,183 | 8/1975 | Saito | 354/219 |
| 4,047,210 | 9/1977 | Espig | 354/238 |
| 4,083,059 | 4/1978 | Tsunikawa et al. | 354/149 |

*Primary Examiner*—Stephen J. Tomsky
*Assistant Examiner*—William B. Perkey
*Attorney, Agent, or Firm*—Watson, Cole, Grindle & Watson

[57] ABSTRACT

An electrically controlled self-timer is operable only when an eye-piece shutter is moved to an operative position to block extraneous light having passed through an eye-piece of the viewfinder optics to prevent it from impinging on a light responsive element, which is normally disposed to receive scene light having passed through a camera objective to generate an electric signal commensurate with the intensity of the light thus received for automatic exposure control. When a manually operable member is at a predetermined position, the eye-piece shutter is moved to the operative position and a switch is closed to operate a self-timer control circuit. Further, when the manually operable member is at another predetermined position the eye-piece shutter remains at the operative position, or alternatively when another manually operable member is operated, another switch is closed to initiate the operation of the electric control circuit which has been made operable beforehand by the closing of the first mentioned switch. In response to the operation of the electric control circuit, the self-timer operation is initiated.

11 Claims, 7 Drawing Figures

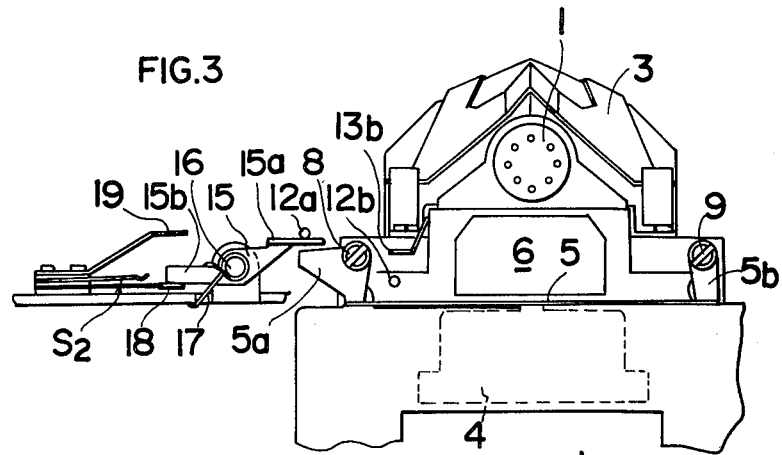
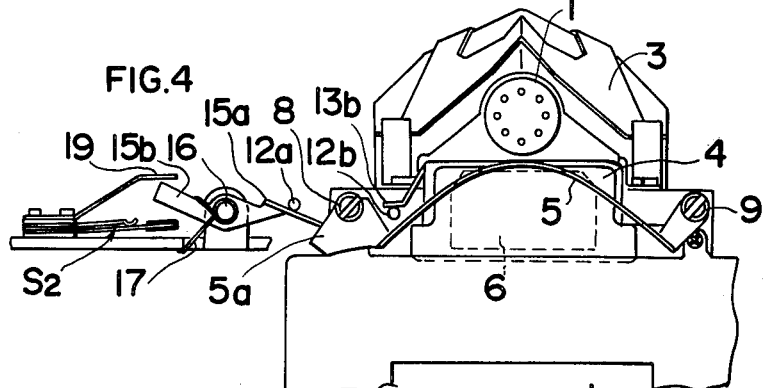
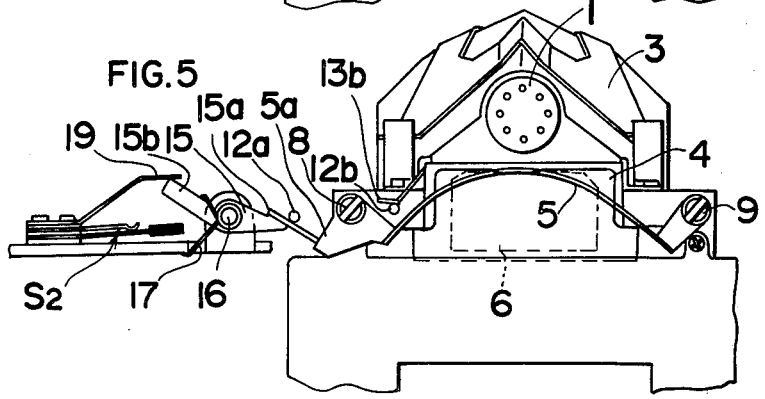

ELECTRICALLY CONTROLLED SELF-TIMER DEVICES FOR SINGLE LENS REFLEX CAMERAS

BACKGROUND OF THE INVENTION

1. Field of the Invention

This invention relates to TTL light measurement single lens reflex cameras with electric self-timers, and more particularly to such type cameras having a light receiving element disposed in a position where incident light from a finder eye-piece is likely to impinge on the aforesaid light receiving element used for the TTL light measurement in which exposure is controlled according to an output level of the light-receiving element.

2. Prior Art

A known TTL light measurement single lens reflex camera of the type described has the drawback that, when a picture is taken with the finder eye-piece not shielded from light, rather than covered by the operator's face, such as in self-timer photography, improper exposure results due to the influence of incident light through the eye-piece. To eliminate this drawback, most cameras of this type have an eye-piece shutter arranged to be moved into and out of the optical finder path, so that, during self-timer photography, the eye-piece shutter may be operated to shield the light receiving element from the incident light through the eye-piece.

Despite such arrangements, for self-timer photography, the operator is liable to forget to shift the eye-piece shutter to a shielding position. If the operator is aware of his failure immediately after the photography, the picture could be taken again by shifting the eye-piece shutter to the shielding position. However, it is most likely that the operator is not aware of his failure to shift the eye-piece shutter to the shielding position until the picture is developed. This results in a picture of improper exposure, despite the fact that an automatic exposure control device is used. Such a failure of an operator as described is independent of whether the self-timer is a mechanical or an electrical device. With a mechanical self-timer, the charging operation for starting the self-timer is required beforehand, so that in association with the charging operation, the operator becomes aware of the necessity to shift the eye-piece shutter to a shielding position. However, with an electric self-timer, no charging operation is required so that self-timer photography is effected by actuating a member for starting th self-timer, such that the operator is apt to forget to shift the eye-piece shutter to a shielding position. The aforesaid careless mistake is accordingly more frequently experienced with an electrical self-timer than with a mechanical self-timer.

SUMMARY OF THE INVENTION

It is accordingly an object of the present invention to provide a TTL light measurement single lens reflex camera with an electric self-timer which is capable of preventing the aforesaid failure in self-timer photography due to the careless mistake of the operator.

According to the present invention, there is provided a single lens reflex camera with an electric self-timer having the following components. An eye-piece shutter adapted to be shifted between a shielding position in which the eye-piece shutter blocks a finder optical path, so as to shield a light receiving element from incident light from the finder eye-piece, and a retracted position, in which the eye-piece shutter is retracted from the finder optical path. A self-timer starting unit is adapted to make the electric self-timer operable only when the eye-piece shutter assumes a shielding position, and to prevent actuation of the electric self-timer when the eye-piece shutter is not in a shielding position.

According to the arrangements described, the self-timer starting unit makes the electric self-timer operable only when the eye-piece shutter is in a shielding position, and the light receiving element is shielded from incident light through the eye-piece, so that, should the operator forget to shift the eye-piece shutter to a shielding position, the electric self-timer remains inoperative, whereby an improper exposure is prevented.

In the preferred embodiments, the self-timer starting unit comprises control circuitry placed in an operable condition only when the eye-piece shutter assumes a shielding position.

In these embodiments, by turning the operating member to a first position, the eye-piece shutter may be shifted to a shielding position, and a switching means is also changed over to an operative position. By turning the operating member from the first position to a second position, the control circuitry may be initiated, with the eye-piece shutter maintained in a shielding position and the switching means maintained operative. In such a manner the number of parts may be reduced, thus affording ease of operation as well as the least possibility of mistake in operation. The aforesaid arrangements yet involve a drawback in that, should the operating member be left in the second position, the control circuitry continues operating to maintain the shutter in a released condition and, as a result, upon completion of the film winding and shutter charging operations, exposure is effected unexpectedly. However, this drawback is eliminated by providing biasing means for returning the operating member to the first position. With the provision of the biasing means, there arises a need to prevent a premature stopping of the electric self-timer within its delayed time, due to the operating member returning from the second position to the first position. This need is met by the control circuitry comprising a self-holding type switching means and a switch for making the self-maintaining type switching means conducting in association with the returning of the operating member from the first position to the second position. With this arrangement, even if the switch is inoperable as a result of the returning of the operating member to the first position, the self-maintaining type switching means remains conducting, whereby th electric self-timer continues operating.

Moreover, if first and second operating members are provided, so that, by turning the first operating member to a given position, the eye-piece shutter may be shifted to a shielding position, and the aforesaid switching means may be closed. And by operating the second operating member, the control circuitry may be initiated. With this arrangement, the second operating member may serve another purpose, since so far as the first operating member resumes positions other than the aforesaid given position, there is no risk that the aforesaid switching means is actuated to make the self-timer starting circuitry operable. In this arrangement, however, if there is provided a means for urging the second operating member to a position before being biased, unintentional exposure may be prevented, simultaneously with the completion of the film winding and shutter charging operations. Furthermore, if the control circuitry is of the self-maintaining type, and switching means and a switch for rendering the self-maintaining type switching means conducting in association with the operation of the second operating member are provided, the electric self-timer may continue operating even after the returning of the second operating member to its home position.

The above and other objects and features of the present application will become more apparent from the following description taken in connection with the accompanying drawings.

BRIEF DESCRIPTION OF THE DRAWINGS

FIGS. 3 through 5 are respective rear views of the mechanical portion, showing different operating conditions thereof;

DESCRIPTION OF THE PREFERRED EMBODIMENTS

Figure 1:
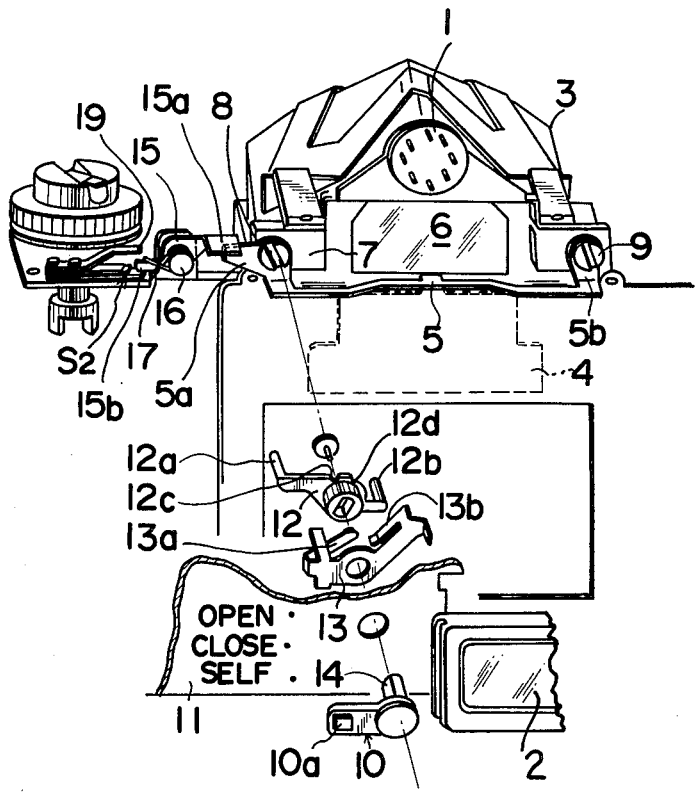
FIG. 1 is an exploded perspective view of a mechanical portion of a camera according to the first embodiment of the present invention.
Figure 2:
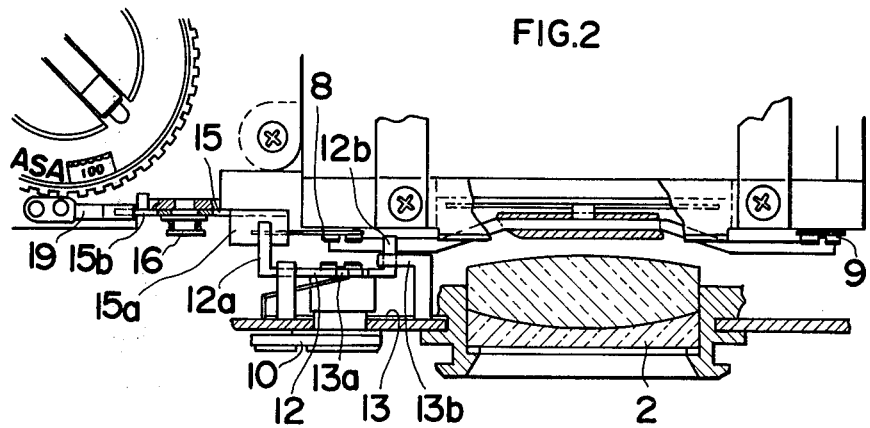
FIG. 2 is a horizontal cross-sectional view of a mechanical portion of the camera.

FIGS. 1 through 6 show the first embodiment of the present invention. Referring first to FIG. 1, light receiving element 1 is positioned above finder eye-piece 2 in opposed relation to the light-emitting surface of pentaprism 3, and light is introduced from an object through an objective lens (not shown) and through pentaprism 3, as well as so-called inversely incident light passing through eye-piece 2 and reflected by pentaprism 3. Light receiving element 1 is disposed in the light measuring circuitry of a known exposure control device (not shown). The exposure control device stores the output of the light receiving element 1 in a storage capacitor prior to the shift of a mirror (not shown) to a picture-taking position. The exposure is controlled according to the output thus stored. Should incident light from eye-piece 2 enter light receiving element 1 before the mirror is shifted to the picture-taking position, the exposure commensurate with the brightness of an object could not be achieved.

Eye-piece shutter 4 shields light-receiving element 1 from incident light from eye-piece 2, the eye-piece shutter being coupled at the top central portion thereof to flexible and resilient plate 5 in a manner into or out of the space between eye-piece 2 and pentaprism 3 and is normally retained in a retracted position in which eye-piece shutter 4 does not block the finder optical path, as shown in FIG. 1. Resilient plate 5 is supported at opposite end portions 5a, 5b by shafts 8, 9, respectively, which in turn are rigidly mounted on support 7 having opening 6. When one bent portion 5a is pressed downwardly at its tip, as viewed in FIG. 1, resilient plate 5 becomes flexed, with the left half thereof turned counterclockwise about shaft 8, and with the right half thereof turned clockwise about shaft 9, thereby shifting eye-piece shutter 4 from the retracted position shown in FIG. 1 to the shielding position in which the shutter blocks the finder optical path.

A manually operable means, such as operating lever 10, serves to operate eye-piece shutter 4 and to start an electric self-timer to be described later. Operating lever 10 is mounted on the rear surface of camera housing 11 and is free to be turned to set lever end 10a selectively to one of the characters "OPEN", "CLOSE" and "SELF" inscribed on the rear surface of camera housing 11. Transmission member 12 includes bent portions 12a, 12b and cutouts 12c, 12d, and spring member 13 is formed with elastic pieces 13a, 13b. Transmission member 12 is turned jointly with operating lever 10, since oval-shaped shaft 14 of operating lever 10 is fitted in member 12. Spring member 13 is rigidly mounted to camera housing 11. When operating lever 10 takes a home position in which lever end 10a is set to "OPEN", elastic piece 13a of spring member 13 is brought into engagement with cutout 12c in transmission member 12. If operating lever 10 is turned counterclockwise to a first predetermined position in which lever end 10a is set to "CLOSE", transmission member 12 is also turned in that direction, so that elastic piece 13a is disengaged from cutout 12c and engages with another cutout 12d in transmission member 12. If operating lever 10 is further turned from that position counterclockwise to a second predetermined position in which lever end 10a is set to "SELF", bent portion 12b of transmission member 12 presses elastic piece 13b of spring member 13, whereby the spring member is flexed, and elastic piece 13a thereof is disengaged from cutout 12d.

Actuating lever 15 is adapted to depress bent portion 5a of resilient plate 5 for flexing the plate as well as to open and close switches S2, S3. Actuating lever 15 is normally spring-loaded as at 17 to turn counterclockwise, as viewed in FIGS. 3 through 5, about shaft 16 rigidly secured to camera housing 11, and has bent portion 15a which is normally maintained in contact with bent portion 12a of transmission member 12, so that when transmission member 12 is turned counterclockwise, as viewed in FIG. 1, bent portion 15a of lever 15 is rotated by the transmission member, whereby lever 15 is turned clockwise. FIGS. 3 through 5 show the positions of actuating lever 15 when operating lever 10 is turned to set lever end 10a to "OPEN", "CLOSE" and "SELF", respectively. In FIG. 3, there is shown the condition in which bent portion 15a of actuating lever 15 is positioned above bent portion 5a of resilient plate 5, and in FIGS. 4 and 5, the bent portion of the former element depresses bent portion 5a of the plate 5, with the resilient plate flexed.

Actuating lever 15 is made of an electrically conductive material and has arm 15b which is adapted to contact an electrically insulating cover 18 of a movable contact of a first switch S2, to thereby open the switch, and which also serves as a movable contact for a second switch S3. If actuating lever 15 assumes the position shown in FIG. 3, switch S2 remains open since the movable contact is pressed by arm 15b of lever 15. If actuating lever 15 is turned clockwise to assume the position shown in FIGS. 4 or 5, arm 15b of lever 15 detaches from the movable contact of switch S2, so that switch S2 closes by virtue of the resiliency of the movable contact itself. In the condition shown in FIGS. 3 or 4, arm 15b of actuating lever 15 is maintained out of contact with fixed contact 19 of switch S3. When actuating lever 15 is turned to assume the position shown in FIG. 5, arm 15b contacts fixed contact 19, to thereby close switch S3. Shaft 16, by which actuating lever 15 is supported on camera housing 1, is rigidly mounted to camera housing 11 as previously set forth, so that arm 15b of actuating lever 15, namely the movable contact of switch S3, is grounded by shaft 16 to camera housing 11.

Figure 6:
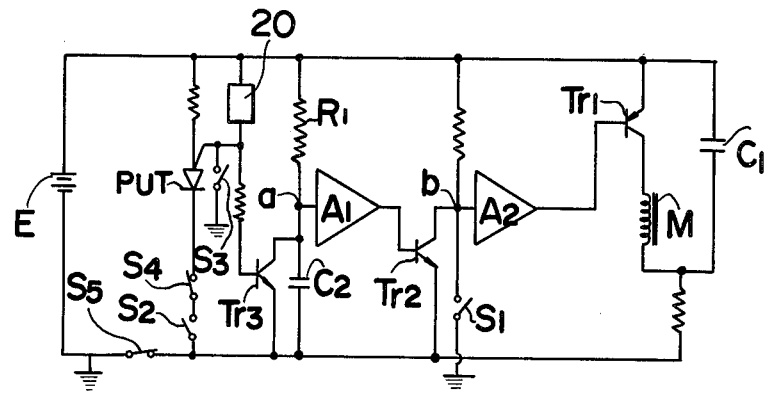
FIG. 6 is a diagram of an electric circuit incorporated in the camera of FIG. 1.

FIG. 6 shows an electric circuit, excluding exposure controlling circuitry, for the first embodiment of the invention. The combination of capacitor C1, electromagnet M, transistor Tr1, switching circuitry A2 and switch S1 constitutes electromagnetic release circuitry. The combination of capacitor C2, resistor R1, switching circuitry A1 and transistor Tr2 contitutes self-timer circuitry. The combination of PUT (programmable unijunction transistor), switch S3 and transistor Tr3 constitutes control circuitry. Switch S2, connected in series to PUT, is adapted to be turned on or off by actuating lever 15. Switch S4 is adapted to open simultaneously with the termination of exposure and to close upon completion of the film winding and shutter charging operations. Switch S5, connected between battery E and the respective circuits is adapted to open due to the operation of a drive mechanism (not shown) when the shutter is released, and is adapted to close simultaneously with termination of exposure.

In the electric circuit shown in FIG. 6, when switch S5 is closed, capacitor C1 charges, and the emitter of transistor Tr3 is grounded, thereby producing a potential across the base-emitter thereof, whereby transistor Tr3 becomes conducting. As a result, junction a between resistor R1 and capacitor C2 is grounded, thereby producing a low level output from switching circuitry A1, whereby transistor Tr2 becomes non-conducting. As a consequence, a high potential of a given level is derived at point b, so that switching circuitry A2 produces a high level output, and transistor Tr1 becomes non-conducting. When switch S3 is thereafter closed, while switches S2, S4 and S5 are all maintained closed, the gate terminal of PUT is grounded, to thereby make PUT conductive, whereby the potential across the base-emitter of transistor Tr3 becomes nil, and thus transistor Tr3 is instantaneously cut off. Consequently, the charging of capacitor C2 starts, and when the potential at point a is raised to a given level after a given time delay, which is determined according to the capacity of capacitor C2 and the resistance of resistor R1, switching circuitry A1 is inverted to produce a high level output, thereby making transistor Tr2 conductive. Thus, point b is grounded (with switch S1 closed as described hereinafter), so that switching circuitry A2 is also inverted, to thereby produce a low level output, making transistor Tr1 conductive. Consequently, capacitor C1 starts discharging through transistor Tr1 and electromagnet M, and the discharge current from capacitor C1 excites electromagnet M, whereby shutter release is effected.

Switch S1 is adapted to be closed by depressing a button (not shown) and is connected in parallel to transistor Tr2. If switch S1 is closed, shutter release is effected independently of the self-timer circuitry. Indicating member 20, such as a lamp or buzzer, is energized by the gate current of PUT, for the duration in which PUT is conducting, to indicate that the self-timer is in operation.

In self-timer photography, the operator first sets the composition of a picture through the finder, followed by focusing the lens, and fixing the camera on a tripod, and thereafter the operator turns operating lever 10 counterclockwise from the position shown in FIG. 1. When operating lever 10 is turned to a position in which lever end 10a is set to "CLOSE", bent portion 12a of transmission member 12 turns actuating lever 15 clockwise to the position shown in FIG. 4, so that bent portion 5a of resilient plate 5 is pressed downwards by bent portion 15a of actuating lever 15, whereby resilient plate 5 becomes flexed, eye-piece shutter 4 is lifted to a shielding position, and switch S2 is closed. Since at this time switches S4, S5 are all maintained closed, PUT is ready to become conductive whenever switch S3 is closed to ground the gate terminal of PUT. If operating lever 10 is further turned until lever end 10a is set to "SELF", then actuating lever 15 is turned to the position shown in FIG. 5, with its bent portion 15a urging bent portio 5a of resilient plate 5 downwards, and arm 15b of lever 15 is brought into contact with fixed contact 19 of switch S3. Switch S3 is thus closed, and PUT becomes conductive, so that the gate current thereof operates indicating member 20. Moreover, transistor Tr3, which has been made conductive during this time is rendered nonconductive. As a result, capacitor C2 starts charging, and switching circuitry A1 is inverted after a given time delay which is determined according to the capacity of capacitor C2 and the resistance of resistor R1, thereby making transistor Tr2 conductive. Thus, switching circuitry A2 is also inverted, thereby making transistor Tr1 conductive, whereby capacitor C1 starts discharging, and electromagnet M is excited by the discharge current, thereby permitting shutter release.

If operating lever 10 is turned until lever end 10a is set to "SELF", then elastic piece 13b of spring member 13 is rotated by bent portion 12b of transmission member 12, to a position in which elastic piece 13a of spring member 13 is disengaged from cutout 12d of transmission member 12 as previously described. Switch S3 is therefore opened immediately after PUT has been made conductive, and PUT is maintained conducting at this stage of the operation, and therefore performs the function of a self-holding switching element.

The aforesaid shutter release operation causes the operation of a drive mechanism (not shown), and the diaphragm is stopped-down to a preset aperture value, a mirror is shifted to a picture-taking position, and thereafter, a shutter leading curtain is released to initiate exposure. Switch S5 is opened at an appropriate time during the aforesaid operation, thereby making PUT non-conducting, whereby the operation of indicating member 20 is stopped. After a period of time commensurate with the voltage stored in the aforesaid storage capacitor, commencing with the initiation of the traveling of the shutter leading curtain, the shutter trailing curtain travels in association with the operation of an exposure control device, and exposure is terminated. Thus, switch S5 is closed, and in turn switch S4 is opened. Since switch S4 is maintained open until the subsequent film winding and shutter charging operations are terminated, should operating lever 10 be turned to the position in which lever end 10a is set to "SELF" without effecting the film winding and shutter charging operations, PUT remains non-conductive, and hence the aforesaid self-timer circuitry remains inoperative.

When switch S5 closes, capacitor C1 is charged, thereby permitting shutter release for subsequent photography. Furthermore, transistor Tr3 becomes conductive, and capacitor C2 discharges through the transistor, thus permitting self-timer photography for the subsequent cycle. When self-timer photography is no longer wanted, it is only necessary for the operator to turn operating lever 10 to the position in which lever end 10a is set to "OPEN". As a result, bent portion 12a of transmission member 12 is disengaged from bent portion 15a, so that resilient plate 5 is returned to the position shown in FIG. 1 by virtue of its own resiliency, whereupon eye-piece shutter 4 is shifted from a shielding position to a retracted position, thereby uncovering the finder view field. At the same time, switch S2 is opened, as shown in FIG. 1.

After operating lever 10 has been turned to the position in which lever end 10a is set to "SELF" for self-timer photography, if the operator desires to interrupt the self-timer photography during the time delay of the self-timer, then it is only necessary to turn operating lever 10 until lever end 10a is set to "OPEN". Thus, switch S2 opens, so that PUT becomes non-conductive, and transistor Tr3 in turn becomes conductive, whereby capacitor C2 discharges, thereby interrupting operation of the self-timer circuit.

Figure 7:
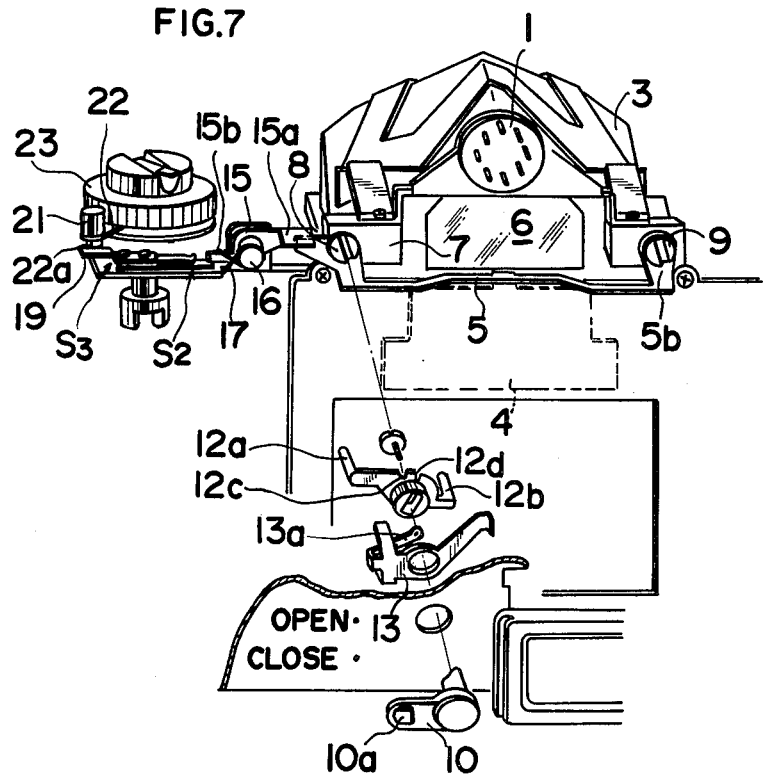
FIG. 7 is a perspective view of the mechanical portion of a camera according to a second embodiment of the present invention.

In the embodiment shown in FIGS. 1 through 6, operating lever 10 serves as a member for shifting eye-piece shutter 4 and also as a member for starting the electric self-timer. A second embodiment of the invention shown in FIG. 7 includes a member for starting an electric self-timer, separately from operating lever 10.

In the second embodiment, a second manually operable means, such as operating button 21, starts the electric self-timer and is rigidly secured by electrically conductive leaf spring 22, which serves as a movable contact of switch S3. When operating button 21 is depressed a first position to second position, projection 22a of leaf spring 22 contacts fixed contact 19, thereby closing switch S3. Leaf spring 22 also serves as a means for locking film sensitivity setting dial 23 to prevent an unwanted rotation thereof and is adapted to release the dial from the locked condition only when operating button 21 is depressed. Operating lever 10 (the first manually operable means) in this embodiment is arranged to be turned between a first position in which lever end 10a is set to "OPEN" and a second position in which lever end 10a is set to "CLOSE". Spring member 13 accordingly has no elastic piece 13b, but an elastic piece 13a which is adapted to engage cutouts 12c and 12d in transmission member 12. The construction other than the above-described structure is exactly the same as in the first embodiment, and hence no further description is necessary.

In the second embodiment, following the turning of operating lever 10 to the position in which lever end 10a is set to "CLOSE", operating button 21 is depressed, thereby initiating operation of the self-timer circuitry. More specifically, the turning of operating lever 10 to "CLOSE" causes actuating lever 15 to turn clockwise, whereby eye-piece shutter 4 is lifted to a shielding position, thereby shading light receiving element 1 from incident light from eye-piece 2. Also, switch S2 closes to condition PUT to be conductive. When switch S3 closes by depressing button 21, PUT becomes conductive, and in turn transistor Tr3 becomes non-conductive, and the self-timer circuitry starts operating.

Since, in this embodiment, switch S2 opens by setting operating lever 10 at a point at which lever end 10a is set to "OPEN", PUT remains non-conductive even with the closing of switch S3. Accordingly, depression of operating button 21 unlocks film sensitivity setting dial 23, without operating the self-timer circuitry, so that dial 23 may be reset to a desired point. In cases where operating button 21 is depressed for self-timer photography, while eye-piece shutter 4 is left in the retracted position because the operator fails to turn operation lever 10 to the position in which lever end 10a is set to "CLOSE", PUT remains non-conductive, and hence indication member 20 remains inoperative. Thus, the operator may be made aware of his failure to set operating lever 10 at a given point.

The present invention has been described with reference to the embodiments shown, but is not limited thereto. For example, instead of switch S2 being opened or closed in association with the turning of actuating lever 15, that switch may be designed to open or close in association with the shifting of eye-piece shutter 4 itself. The control circuitry for starting the self-timer circuitry may be replaced by a switch connected in parallel with capacitor C2. In such cases, the switch should be arranged to open by turning the operating lever to the self-timer starting position only when eye-piece shutter 4 is shifted to the shielding position, and a means for retaining the switch in the open position should be provided. However, these provisions may be only obtained with the self-timer circuitry arranged so that switching circuitry A1 is inverted in response to an increase in potential at the point a to a given level. Where it is desired to incorporate the aforesaid switch in the self-timer circuitry in which capacitor C2 is charged beforehand, and the output of switching circuitry A1 is inverted when the potential at the point a drops to a given level due to the discharge of the capacitor, such a switch should be arranged to be closed by turning the operating member to the self-timer starting position only when eye-piece shutter 4 is shifted to the shielding position. Apart from the above-described structure, if switch S3, shown in FIG. 6, is arranged to close by turning the operating member to the self-timer starting position, only when eye-piece shutter 4 is shifted to the shielding position, then switch S2 is not required.

What is claimed is:

1. A single lens reflex camera in which an exposure is controlled in accordance with an electric signal commensurate with the intensity of scene light having passed through the camera objective, said camera comprising:

viewfinder optics including an eye-piece;
light responsive means for generating said electric signal, said light responsive means being disposed to receive extraneous light having passed through said eye-piece;
means for initiating an exposure;
an electrically controlled self-timer for actuating said exposure initiating means after a predetermined time delay from commencement of the operation of said self-timer;
an electric control circuit for initiating the operation of said self-timer;
manually operable means operable from a home position through a first predetermined position to a second predetermined position;
an eye-pice shutter interlocked with said manually operable means and being in an operative position for blocking said extraneous light to prevent impingement thereof on said light responsive means with said manually operable means in said first or said second position and in an inoperative position withdrawn from said viewfinder optics with said manually operable means in said home position;

switch means for making said electric control circuit operable only when said eye-piece shutter is in said operative position; and means interlocked with said manually operable means for initiating operation of said electric control circuit only when said manually operable means is in said second predetermined position.

2. A single lens reflex camera as in claim 1, further comprising means for biasing said manually operable means to return the same from said second predetermined position to said first predetermined position.

3. A single lens reflex camera as in claim 2, wherein said switch means includes a first switch which is closed to make said electric control circuit operative when said manually operable means reaches said first predetermined position from said home position.

4. A single lens reflex camera as in claim 3, wherein said electric control circuit includes a self-holding switching element connected in series with said first switch to be conditioned to become conductive with said first switch closed, and wherein said means for initiating operation of said electric control circuit includes a second switch which is closed to make said self-holding switching element conductive when said manually operable means reaches said second predetermined position, said electric control circuit being connected to said self-timer to initiate operation thereof when said self-holding switching element is made conductive with said first switch being kept closed.

5. A single lens reflex camera as in claim 4, wherein said self-timer includes a resistor, a capacitor connected in series with said resistor and charged through said resistor when said self-holding switching element is made conductive with said first switch being kept closed, and a switching circuit connected to said capacitor for generating an exposure initiating signal when the voltage across said capacitor reaches a predetermined level, and wherein said exposure initiating means is responsive to the exposure initiating signal.

6. A single lens reflex camera as in claim 4, further comprising means for making said self-holding switching element non-conductive upon initiation of an exposure by said exposure initiating means.

7. A single lens reflex camera as in claim 6, further comprising means for conditioning said self-holding switching element to become conductive during the period of time from completion of a film wind-up until termination of an exposure.

8. A single lens reflex camera in which an exposure is controlled in accordance with an electric signal commensurate with the intensity of scene light having passed through the camera objective, said camera comprising:

viewfinder optics including an eye-piece;

light responsive means for generating said electric signal, said light responsive means being disposed to receive extraneous light having passed through said eye-piece;

means for initiating an exposure;

an electrically controlled self-timer for actuating said exposure initiating means after a predetermined time delay from commencement of the operation of said self-timer;

an electric control circuit including a self-holding switching element connected to said self-timer for initiating operation of said self-timer when made conductive;

first manually operable means operable between respective first and second positions;

an eye-piece shutter interlocked with said first manually operable means and being in an operative position for blocking said extraneous light to prevent impingement thereof on said light responsive means with said first manually operable means in said second position and in an inoperative position withdrawn from said viewfinder optics with said first manually operable means in said first position;

a first switch closed with said first manually operable means in said second position for conditioning said self-holding switching element to become conductive;

second manually operable means operable between respective first an second positions;

a second switch closed in response to the operation of said second manually operable means from said first position to said second position for making said self-holding switching element conductive; and means for biasing said second manually operable means to said first position.

9. A single lens reflex camera as in claim 8, further comprising means for making said self-holding switching element non-conductive upon initiation of an exposure by said exposure initiating means.

10. A single lens reflex camera as in claim 9, further comprising means for conditioning said self-holding switching element to become conductive during the period of time from completion of a film wind-up until termination of an exposure.

11. A single lens reflex camera as in claim 8, wherein said self-timer includes a resistor, a capacitor connected in series with said resistor and charged through said resistor when said self-holding switching element is made conductive with said first switch being kept closed, and a switching circuit connected to said capacitor for generating an exposure initiating signal when the voltage across said capacitor reaches a predetermined level, and wherein said exposure initiating means is responsive to the exposure initiating signal.

* * * * *